INVENTOR.
ROBERT H. SMITH

ATTORNEYS

United States Patent Office 3,459,225
Patented Aug. 5, 1969

3,459,225
DIRECTIONAL CONTROL VALVE
Robert H. Smith, Warren, Mich., assignor to Sperry Rand Corporation, Troy, Mich., a corporation of Delaware
Filed July 12, 1967, Ser. No. 652,801
Int. Cl. F16k 11/07
U.S. Cl. 137—625.65                    9 Claims

ABSTRACT OF THE DISCLOSURE

An electrically actuated directional control valve having in combination a spool and single push pin for controlling communication between certain fluid conducting passages therein, the push pin which extends through the spool is slidably mounted at its opposite ends within push pin guide bores and having an enlarged center section which is adapted for both pivotal movement anl radial translation relative to the spool to compensate for misalignment between the push pin and the push pin guide bores.

Background of the invention

This invention relates to power transmissions, particularly to those of the type comprising two or more fluid pressure energy translating devices, one of which may function as a pump and another as a fluid motor.

The invention is generally concerned with a directional control valve mechanism for controlling the direction of fluid flow in such transmission systems. In particular, the invention relates to an improvement in the construction of a directional control valve spool and push pin such as illustrated in the patent to D. B. Gardiner, No. 2,591,800.

In units of this type it has been a conventional practice to have loose push pins transmitting the solenoid plunger thrust to the valve spood for actuating the same. If there is any pressure in the tank chamber, the resultant force will be transmitted by the pins to the solenoids and if this is too high, the solenoid will stall and the coil may burn out.

Because of this limitation, other constructions have been designed to minimize the heretofore noted adverse solenoid condition, such as illustrated in the patent to R. S. Miller No. 2,251,750. This design eliminates the back pressure stalling by removal of the loose push pins and incorporating push pins which are integral with the spool.

Still other types of constructions have been designed to eliminate the heretofore noted back pressure stalling. This is accomplished by having a hollow spool with a one-piece push pin extending therethrough and held to the spool by snap rings. The clearance between the spool and push rod permits an instantaneous pressure equalization across the valve spool thus eliminating the back pressure stallings.

In valves of this type, O ring seals shield the solenoids from the pressurized fluid in the tank chambers, however, in those valves which use a single push pin (either integral with a spool or extending through a hollow spool) there has been a premature deterioration of these seals. This is due to the eccentricity between the spool receiving bore and the push pin receiving bores.

Summary

This invention comprises an electrically actuated directional control valve, the housing of which has a spool slidably mounted therein with a single push pin extending through a step bore in the spool, and having seals at opposite ends of the housing wherein the pin is slidably mounted within push pin guide bores, the push pin having an enlarged center section which is spring biased against the bore step for both pivotal movement and radial translation relative thereto for compensating for misalignment between the pin guide bore and push pin.

It is therefore an object of this invention to provide an improved directional control valve having a spool and push pin construction which is readily adapted to low cost manufacturing.

It is another object of this invention to provide an improved directional control valve having a spool and push pin construction which allows for misalignment between the push pin and spool bores.

It is a further object of this invention to provide an improved directional control valve having a spool and push pin construction adapted for solenoid operation and which eliminates solenoid stall and which operated without backlash even after extensive use.

Still a further object of this invention is to provide an improved directional control valve having a spool and push pin construction which is easy to maintain and assemble and disassemble.

Further objects and advantages of the present invention will be apparent from the following description, reference being made to the accompanying drawing wherein a preferred form of the invention is clearly shown.

Figure 1:
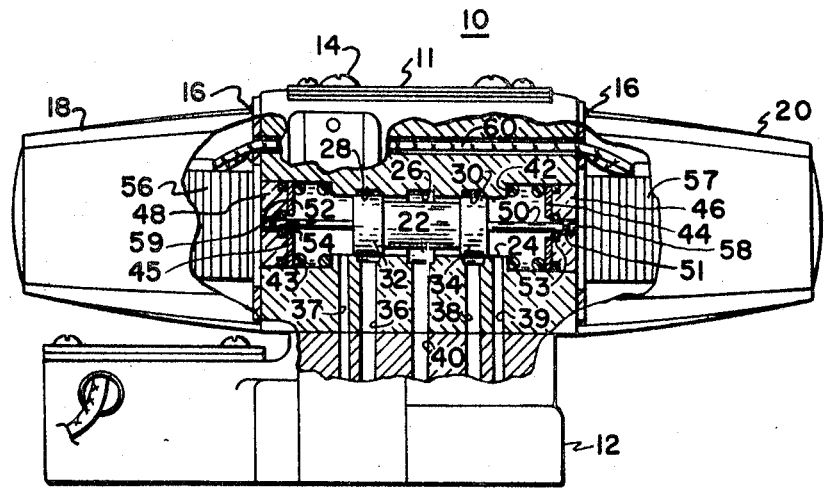
FIG. 1 is a partial sectional front elevational view of a solenoid operated directional control valve.

Referring now to FIG. 1, there is shown a directional control valve, indicated generally by the numeral 10, the housing 11 of which is mounted on a manifold 12 and is secured thereto by any suitable fastening means such as screws shown at 14. Attached to the control valve housing 11 by any suitable fastening means such as screws shown at 16, are solenoid housings 18 and 20.

A solenoid operated valve spool 22 is reciprocably mounted in a bore 24 of the housing 11. The bore 24 is provided with spaced apart grooves forming a pressure port 26 and a pair of operating ports indicated by the numerals 28 and 30. The spool lands 32 and 34 are adapted to connect the pressure port with either port 28 or 30 for the purpose of conducting pressurized fluid through passage 36 or 38 to a pressure energy translating device (not shown) for use by the same. The pressure port 26 is adapted to be connected to a source of pressurized fluid (not shown) by means of passageway 40. Passageways 37 and 39 are adapted to connect the outer ends of bore 24 to a reservoir (not shown) thus maintaining the same pressure at opposite ends of spool 22. When spool 22 is shifted right-handedly, spool land 32 permits communication between operating port 28 and tank passage 37 and when shifted lefthandedly, land 34 permits communication between operating port 30 and tank passage 39, thus providing a return flow path from the pressure energy translating device (not shown) to the reservoir.

Both ends of the bore 24 are enlarged to provide mounting chambers respectively, for right and left end springs 42 and 43, spring retainers 44 and 45 and operating pin guides 46 and 48. The solenoid operated push pin 50 is slidable at opposite ends thereof within pin guide bores 51 and 52 while O ring seals 53 and 54 prevent pressurized fluid from being admitted through the pin guide bores and into the solenoids 56 and 57 which are encased in solenoid housings 18 and 20 respectively. The pin 50 is shifted in the \conventional manner by suitable solenoid armature pins 58 and 59 which abut pin 50 at opposite ends thereof within pin guide bores 51 and 52 respectively. The solenoids are connected to conductors 60 which are adapted to be connected to a source of electrical energy, not shown, for operating the solenoids.

Depending upon which solenoid is actuated, the movement of the directional control valve spool 22 will allow pressurized fluid to flow from the pressure port 26 either to operating port 28 or to operating port 30, while directing return flow respectively from either operating port 30 to passage 39 or operating port 28 to passage 37.

Figure 2:
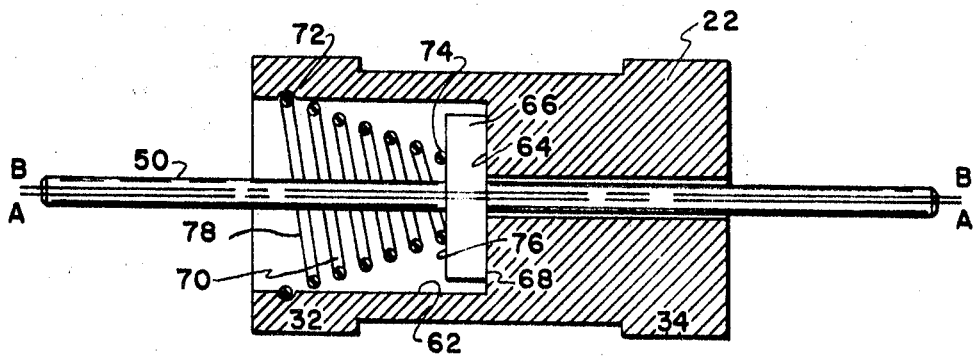
FIG. 2 is an enlarged partial sectional view of the spool and push pin as illustrated in FIG. 1.

Referring now to FIG. 2, there is shown the spool 22 having a bore 62 extending therethrough with a step 64 formed therein. The push pin 50, which extends through the spool, has an enlarged cylindrical center section 66 the face 68 of which abuts the step 64 and is adapted for both pivotal movement and radial translation relative to the step 64. For this purpose, the face 68 of section 66 is biased against step 64 by a conical spring 70 which is disposed within the bore 62 between the section 66 and a spring receiving groove 72. The right end 74 of the spring is adapted to abut face 76 of section 66 opposite to face 68 while the base end 78 engages the receiving groove 72 and is held in position by the same. The spring 70 is designed to pre-load section 66 against step 64 with a force which is greater than that produced by the solenoid 58 resulting in an improved valve response due to the elimination of spool backlash. Sufficient clearance space is provided between the spool bore 62 and the push pin 50 to permit pivotal movement and radial translation of the pin without interference between the pin and spool bore.

As hereinbefore mentioned in prior art devices the eccentricity between the push pin guide bores 51 and 52 and the spool receiving bore 24 will result in a misalignment between the push pin 50 and pin guide bores 51 and 52. This misalignment imposes an excessive side force on the seals 53 and 54 by the push pin 50 resulting in the herebefore mentioned seal deterioration.

From the foregoing it is readily apparent that a simple and effective arrangement has been provided to compensate for the eccentricity between the pin guide bores and the spool receiving bore. For example, if the pin guide bores 51 and 52 are aligned about axis A—A but eccentric with respect to the spool receiving bore axis B—B, the pin 50 will shift radially with respect to the spool B—B axis and align itself with the pin guide bore axis A—A. Further, if the pin guide bores 51 and 52 are eccentric with respect to each other in addition to the spool receiving bore 24, the push pin 50 in addition to the radial shift will pivot on the section face 68 about the spool bore step 64 thus simultaneously, compensating for the eccentricity between each of the pin guide bores and the spool receiving bore.

Thus the spool, pin, and spring assembly constitutes a basic form adapted for mounting within a control valve housing which may be controlled by either a solenoid or by mechanical means and in which its construction compensates for misalignment between the push pine and push pin guide bores resulting in an elimination of the herebefore mentioned seal deterioration and which operates without backlash even after extensive use.

What is claimed is as follows:

1. An electrically actuated valve comprising:
   a housing with a spool receiving bore therein, including a plurality of spaced apart valve ports, and having passage means for conducting fluid to and from said valve ports:
   a spool means slidably disposed in said receiving bore for controlling communication between certain of said ports and having means forming a stepped bore extending through said spool;
   a pin smaller than said bore for shifting said spool having means forming a step section thereon, said pin being mounted within and extending through said step bore with a face of said pin step section abutting a face of said bore step;
   resilient means carried by said valve member and disposed within said step bore, said resilient means biasing at a predetermined value the face of said pin step section against said bore step face to permit both pivotal movement and radial translation of said pin relative to said bore step face;
   electrically operated means on opposite sides of said spool for controlling the movement of said spool, one of which abuts said pin at one end thereof, the other abutting the pin at its other end; and,
   sealing means on opposite sides of said spool between said spool and each of said operating means, each of said sealing means having a pin guide bore therein in which the opposite ends of said pin are slidably mounted, wherein said pivotal movement and radial translation of said pin relative to said bore step face compensates for misalignment between the pin guide bores and the pin.

2. An electrically actuated valve as described in claim 1 wherein said pin step section is an enlarged portion of said pin extending radially outward therefrom, one face of which is in abutment with said bore step face; and said resilient means being carried by said spool exerts its resilient bias against the pin step face opposite said first mentioned pin step face.

3. An electrically actuated valve as described in claim 2 wherein said resilient means is a conical retainer spring, one end of which is carried within the spool step bore, the other end of which abuts said opposite pin step face.

4. A valve apparatus comprising:
   a housing having means forming a plurality of fluid passageways;
   a valve member shiftably mounted in said housing for controlling communication between certain of said passageways, and having means forming a bore extending therethrough, said bore having a step section formed therein;
   a push pin smaller than said bore for shifting said valve member having means forming a step section thereon, said pin being mounted within and extending through said step bore with a face of said pin step section abutting a face of said bore step section;
   resilient means carried by said valve member and disposed within said step bore, said resilient means biasing at a predetermined value the face of said pin step section against said bore step section face to permit both pivotal movement and radial translation of said pin relative to said bore step section face;
   actuating means on opposite sides of said valve member for controlling the movement of said valve membe, one of which abuts said pin at one end thereof, the other abutting the pin at its other end; and,
   sealing means on opposite sides of said valve member between said valve member and each of said actuating means, each of said sealing means having a pin guide bore therein in which the opposite ends of said pin are slidably mounted, wherein said pivotal movement and radial translation of said pin relative to said bore step section face compensates for misalignment between the pin guide bores and the pin.

5. A valve apparatus as described in claim 4 wherein said resilient means comprises a spring.

6. A valve apparatus as described in claim 5 wherein said spring is a conical retainer spring.

7. A valve apparatus as described in claim 4 wherein said pin step section is an enlarged portion of said pin extending radially outward therefrom, one face of which is in abutment with said bore step section face; and said resilient means being carried by said valve member exerting its resilient bias against the pin step face opposite said first mentioned pin step face.

8. A valve apparatus as described in claim 7 wherein said resilient means is a conical retainer spring, one end of which is carried within the step bore, the other end of which abuts said opposite pin step face.

9. A valve apparatus as described in claim 8 wherein said actuating means comprises a pair of electrically operated solenoids, at opposite ends of said valve member.

(References on following page)

References Cited

UNITED STATES PATENTS

| | | | |
|---|---|---|---|
| 3,211,183 | 10/1965 | Eickmann | 137—625.48 XR |
| 2,404,349 | 7/1946 | Brant et al. | 137—625.65 |
| 2,591,800 | 4/1952 | Gardiner | 137—625.63 |
| 2,619,121 | 11/1952 | Renick | 251—137 XR |
| 2,630,136 | 3/1953 | Brandes et al. | 137—625.65 |

FOREIGN PATENTS 1,018,602   1/1966   Great Britain.

HENRY T. KLINKSIEK, Primary Examiner

U.S. Cl. X.R.

251—85